United States Patent [19]

Grunewald et al.

[11] Patent Number: 4,616,220

[45] Date of Patent: Oct. 7, 1986

[54] GRAPHICS DISPLAY COMPARATOR FOR MULTIPLE BIT PLANE GRAPHICS CONTROLLER

[75] Inventors: Paul Grunewald, Flemington; Roy L. Blanch, Hampton; James R. Schrage, Flemington, all of N.J.

[73] Assignee: Burroughs Corporation, Detroit, Mich.

[21] Appl. No.: 524,904

[22] Filed: Aug. 22, 1983

[51] Int. Cl.[4] .............................................. G09G 1/16
[52] U.S. Cl. .................................... 340/747; 340/728; 340/703; 340/730
[58] Field of Search ............... 340/703, 701, 728, 729, 340/730, 747; 364/821, 822

[56] References Cited

U.S. PATENT DOCUMENTS 4,189,743 2/1980 Schure et al. ...................... 340/747
4,509,043 4/1985 Mossaides ........................... 340/703

FOREIGN PATENT DOCUMENTS

0016651 10/1980 European Pat. Off. ............ 340/728
2032740 5/1980 United Kingdom ................ 340/703

Primary Examiner—Gerald L. Brigance
Attorney, Agent, or Firm—Mervyn L. Young; Kevin R. Peterson

[57] ABSTRACT

A graphic control system under the control of a host processor to display, on a display monitor, high resolution color graphic images. The graphic control system employs a plurality of graphic display controllers each accessing, in parallel, a separate bit map storage area or a plane. When a gray-scale or color display is required, respective planes are read out in parallel and converted for serial transmission with respective outputs being supplied in parallel as a code to a look-up table of color or gray-scale codes that in turn are supplied to a digital-to-analog converter that drives the display monitor. In addition, a compare circuit is provided to receive outputs sent from the respective bit plane stores for comparison with preset outputs from the host computer to determine when the display monitor has reached a boundary of a figure being filled with a particular color or pattern.

7 Claims, 10 Drawing Figures

| FIG.4B | FIG.4D |
|--------|--------|
| FIG.4A | FIG.4C |

GRAPHICS DISPLAY COMPARATOR FOR MULTIPLE BIT PLANE GRAPHICS CONTROLLER

RELATED U.S. APPLICATIONS

U.S. patent application is related to the subject application is the following:

Ser. No. 524,903, filed Aug. 22, 1983 by Paul Grunewald et al. and entitled "Host Computer Broadcast Mode for Multiple Bit Plane Graphics".

BACKGROUND OF THE INVENTION

1. Field of Invention

This invention relates to a graphic control system for a digital color raster scan display and more particularly to such a control system which provides for high resolution color display to the individual picture element or pixel level.

2. Description of the Prior Art

Initial digital graphic displays were of the vector scan type which did not readily handle alphanumeric displays. Thus, today's graphic displays are of the raster scan type wherein display images are stored in a ROM or RAM and the address generation thereof is automatically controlled by timing circuits including vertical synchronization and horizontal synchronization and the only information needed to be supplied are sequences of ROM or RAM addresses indicating which picture elements are to be illuminated on the display. For alphanumeric character display, character generation circuits have been developed which store individual bit patterns of particular characters which are automatically fetched in proper order when the display of such individual characters is required. By storing the dot pattern of a limited number of characters in a look-up table and by storing character codes, which are to be used as indices in such a look-up table, only a limited amount of storage is required to represent a display image. A similar scheme can be used for the display of graphs, when a limited number of characters are stored from which a graph can be constructed.

Display systems have been designed which provide greater resolution and clarity of characters by displaying images of those characters which were made up of a plurality of different gray-scale levels or levels of luminance such as disclosed in the Seitz et al. U.S. Pat. No. 4,158,200. However, these systems use more storage for the look-up table, in which the characters are stored, as they read more than one bit per dot to represent the gray-scale levels. This was impractical in the past because of the large amount of storage required to store the given number of bits for each pixel. However, great improvements have been made in increasing storage densities of integrated circuit random access memories from 1K RAMS to 4K RAMS, to 16K and 64K RAMS and 256K RAMS will soon be on the market. This allows the display memory to store a sufficient number of information bits to utilize every pixel on the display screen for both alphanumeric and graphic display. A particular graphic display controller which is commercially available is marketed by NEC Electronics, U.S.A., Inc. and described in a functional specification for their µPD 7220/GDC Specification.

High resolution graphic images are displayed out of a large store containing a number of bits to define each dot or pixel on the display screen. Such a store is referred to as a bit map store, as there is a one-to-one correspondence, or mapping between each pixel on the screen and one or more bits in the store. One bit must be used to describe each pixel in a monochrome, non gray-level graphic display. The contents of the bit map store can be updated from a main store which is part of the host processor driving the graphic display controller.

A typical display system uses about 480 scan lines, each containing 640 picture elements or pixels. Thus for each screen image 480×640 or 307,200 pixels need to be stored. A commercially available graphic display controller such as described above can address up to 64 64K dynamic RAM chips or slightly over four million bits. This allows for 13.6 screen images to be stored for the above 480 by 640 configuration. During image display, 16 bit segments are read out of the bit map store and supplied serially to the display monitor.

With the above described system, one bit of storage per pixel is adequate for two-state representations of a graphic image such as black and white. However, if a gray-scale or color image is desired, then more information bits are required per pixel, i.e., two bits for four levels or colors, three bits for eight levels or colors, and so forth. The amount of storage described above is sufficient to use for a multi-level or color display image store, while a single controller can be used to generate the images. However, in that case that graphic display controller will spend more time to generate the images as more than one bit per pixel needs to be generated. The bits used for each pixel are stored in logically separate storage areas, one for each pixel bit, called bit planes.

In the above described system, the graphics display controller (GDC) can write into multiple planes, but only into one plane at a time. The GDCs address space is divided up into several parts, each part corresponding to a plane. Each time the GDC writes a colored line, it must draw the line in each plane. This line is set or reset in a particular plane, depending on the color selected for that line. To increase the performance of a color system one GDC is used for each plane of memory. A GDC is sent its drawing commands and starts drawing. While it draws, another GDC can be set up and given a drawing command and so forth. To further increase performance, it is possible to write the same commands to all GDCs at the same time.

It is then an object of the present invention to provide an improved high resolution graphic control system for graphic display.

It is another object of the present invention to provide an improved high resolution graphic display system with a plurality of bit planes and graphic controllers under simultaneous command of a host processor.

It is still a further object of the present invention to provide an improved high resolution graphic display system that can automatically handle such tasks as filling in colors in an arbitrary boundary.

SUMMARY OF THE INVENTION

In order to accomplish the above-identified objects, the present invention is directed toward a graphic control system under the control of a host processor to display, on a display monitor, high resolution color graphic images. The graphic control system employs a plurality of graphic display controllers each accessing, in parallel, a separate bit map storage area or a plane. When a gray-scale or color display is required by the host processor, the respective planes are read out in parallel and converted for serial transmission with respective outputs being supplied in parallel as a code to a look-up table of color or gray-scale codes that in turn are supplied to a digital-to-analog converter that drives the display monitor. In addition, a compare circuit is provided to receive outputs sent from the respective bit plane stores for comparison with preset outputs from the host computer to determine when the GDC cursors have reached a boundary of a figure being filled with a particular color.

A feature then of the present invention resides in a color graphic control system for supplying different sets of color signals to the display monitor which signals are analog conversions from the output of a look-up table which is addressed by a plurality of bits from a plurality of different graphic bit stores each under the control of separate graphic controllers that in turn receive commands from the host processor.

Another feature resides in a compare circuit to receive the outputs being sent from the respective stores for comparison with a preset value to notify a host computer when a comparison does or does not occur.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

Figure 1:
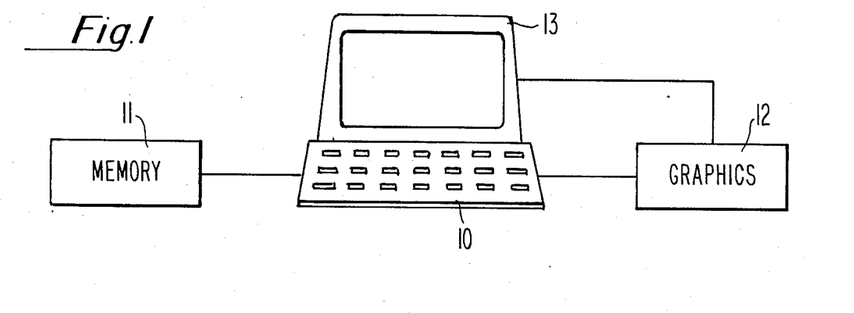
FIG. 1 is a schematic diagram of a work station employing the present invention.

The system involving the present invention is illustrated generally in FIG. 1 and includes a microprocessor based work station 10 which is the system's host processor and may either be a stand alone system or part of a network of such systems. Such a work station would include its own random access memory as well as backup memory 11 which may be of the floppy disk type. Work station 10 is also provided with the display monitor 13 on which various texts and limited resolution graphics may be displayed under control of work station 10. The present invention for producing high resolution graphics is illustrated in FIG. 1 as graphics unit 12 under the control of instructions received from work station 10 to supply high resolution video signals to display unit 13. Host computer 10 may be any of a variety of commercially available desk top computers or work stations such as the Burroughs B20 which employs an Intel 8086 microprocessor and all that is required of graphic extension 12 is that it be compatible with the input/output bus of that microprocessor.

Figure 2:
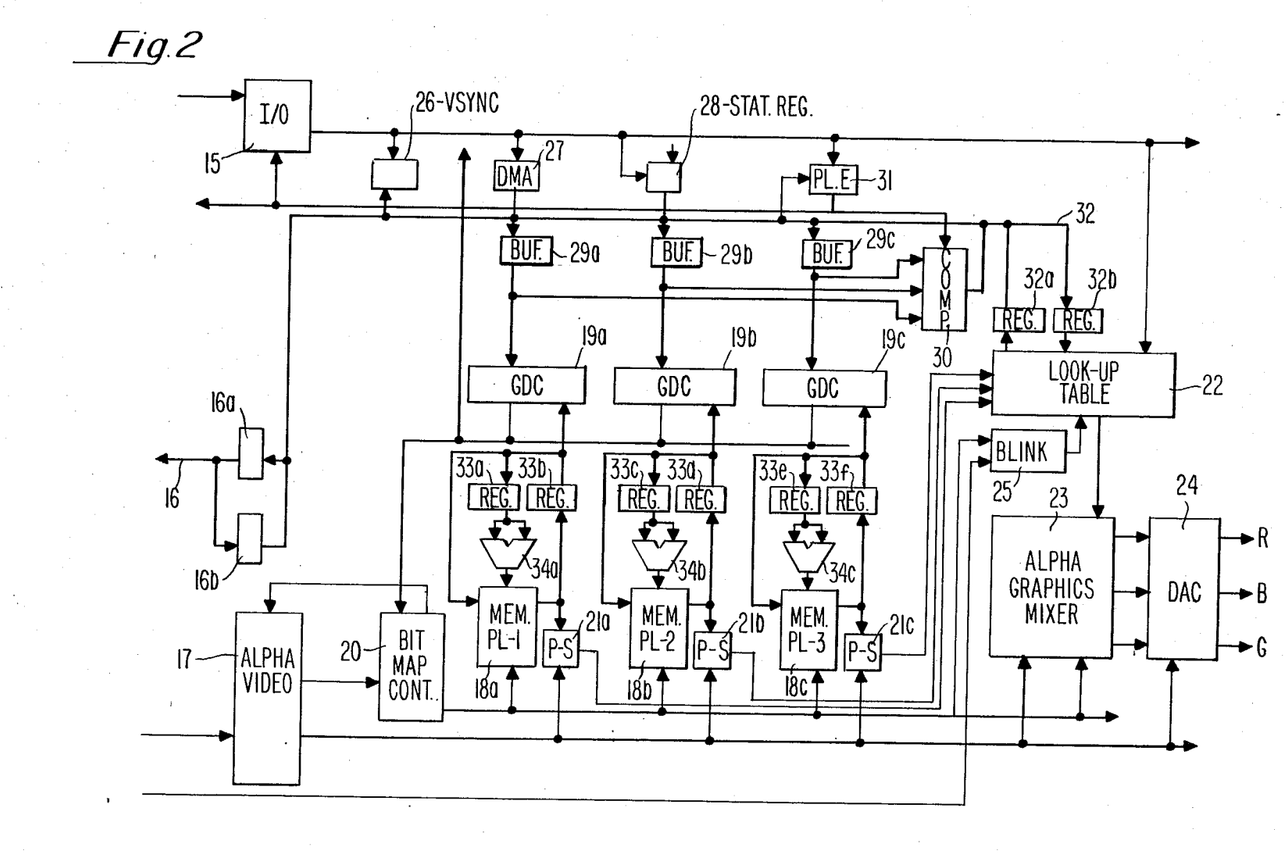
FIG. 2 is a block diagram of the present invention.

A general block diagram of graphic extension 12 of FIG. 1 is illustrated in FIG. 2. The heart of the graphic extension system of FIG. 2 is the three memory planes 18 a, b and c under control of graphic display controllers 19 a, b and c, the latter of which may be of a commercial type described above. The respective graphics display controllers basically control the writing and reading of pixel bit images into and out of the three memory planes which form the bit-store for the color display. However, the contents of the individual memory planes 18 a, b and c differ from that of a single plane bit map store for monochromatic graphics in that the individual bits stored therein do not represent a one-to-one relation to the image to be displayed but rather represent corresponding significant bits of an address to look-up table 22 to select an appropriate color code for the corresponding pixels or picture elements in the image to be displayed.

The outputs of the respective memory plane are a 16 bit series of bits that are read out in parallel to the corresponding parallel to serial converters 21 a, b and c to form three series of bit signals that are supplied in parallel to look-up table 22 as a series of three bit addresses for the corresponding pixels to be activated on the display screen. Look-up table 22 is a sixteen by eight bit RAM which provides an 8 bit code that is sent to alpha graphics mixer 23 to be mixed with alphanumeric signals which are then sent to digital-to-analog converter 24 that generates the actual red, green and blue video signals for supply to the display monitor. It will be appreciated that such an 8 bit code can represent any one of 256 different colors or shades. However, since, in the present invention, a 3 bit address is employed for look-up table 22, only 8 particular colors can be specified at any given time from a "pallet" of 256 colors depending upon what codes have been loaded into look-up table 22.

As was indicated above, it is possible to write the same command to any or all GDCs at the same time. The GDCs to be accessed are selected by the Enable Register 48 of FIG. 5B. When, for example, one wishes to draw a line, all GDCs are set up at the same time up to the parameters which define whether the line is set or cleared in a particular memory plane. The GDCs, which control the planes in which the lines are set, receive these parameters simultaneously, as do the GDCs controlling the planes in which the lines are reset. Then all GDCs are enabled and the draw command is sent to all GDCs at the same time. Thus there is an increase in speed in getting the line drawn. A white line appears as a white line instantaneously rather than red, then cyan, and then white, because all planes are changed at the same time.

While the present embodiment as described employs three memory planes or bit planes, it will be appreciated that any number of such bit planes may be employed depending upon the number of different colors or shades that are desired to be displayed at a given time by the pixels on the display screen during the scanning of that display screen in a raster scan mode. As was indicated above, the use of one bit plane would supply one bit at a time allowing the specification of two states for each pixel such as on or off, two bits would allow the specification of one of four colors or shades and, in the embodiment of the present invention, three bit planes allow for the specification of one of eight different colors or shades.

The alphanumeric signals representing characters to be displayed along with the color graphics are generated in the conventional manner by the host processor 10 of FIG. 1 and received by alpha video unit 17 in FIG. 2 from which they are supplied to the alpha graphics mixer 23. The alphanumeric signals can specify the color in which the characters are to be displayed and dominate or override the color code received from look-up table 22.

The respective bit plane memories 18 a, b and c are accessed continuously to provide data needed to refresh the display and also must be accessed occasionally to change or create images to be displayed. As was indicated above, the corresponding graphic display controllers 19 a, b and c control all accesses to the respective bit plane stores by supplying addresses to the stores at the appropriate times to display the data on the display monitor. The host processor can also access the bit plane stores but only through the respective graphic display controllers. The host processor sends the address of the corresponding graphic display controller to be accessed to ADDRESS, I/O and DMA control unit 15 of FIG. 2 to select one or more of the respective graphic display controllers. Data and commands are then sent by way of data bus 16 and data bus 32 to the respective controllers. In this manner, one or any combination of the bit plane memories can be accessed by one command sequence from the host processor.

The respective graphic display controllers 19 a, b and c can be programmed to give priority to the host processor accesses for the display refresh. When the host processor has priority, the display accesses are interrupted whenever the host processor attempts to access the respective bit plane stores which results in disturbances on the display screen since the data for the display refresh is not available when needed. If the controllers are programmed to give priority to display refresh, then the host processor only has access at times when there will be no interference with the display and the host processor commands and data are stored in the corresponding graphics display controllers until the appropriate time. No image is displayed on the monitor during the horizontal and vertical retrace of the electron beam used to write the images on the screen. If the respective controllers have been programmed to give the display priority then the host processor has access to the bit plane store only during these retrace times. In most monitors such a retrace takes about 20% of the total display time.

Commercially available graphic display controllers such as described above are used not only to control storage accesses but can also generate the display timing by using parameters loaded into the respective controllers during initialization. They also contain their own processors which can generate vectors, rectangles, arcs, and circles from a small number of parameters sent to the respective controllers from the host processor. Microcode resident in the respective controllers allow for very high drawing speeds to be obtained.

In addition to the ability of all of the graphic controllers and their respective bit plane memories of being addressed simultaneously by the host processor to considerably improve system performance when drawing colored objects, special hardware is also employed for looking for boundaries during a color "fill" operation. Compare circuits 30 in FIG. 2 are provided to receive the respective memory plane outputs from the corresponding graphics display controllers and to compare this data with values sent by the host processor and to signal the host processor of such comparison or the lack thereof to enable the host processor to look for figure boundaries during this color fill operation.

DETAILED DESCRIPTION OF THE INVENTION

Figure 3:
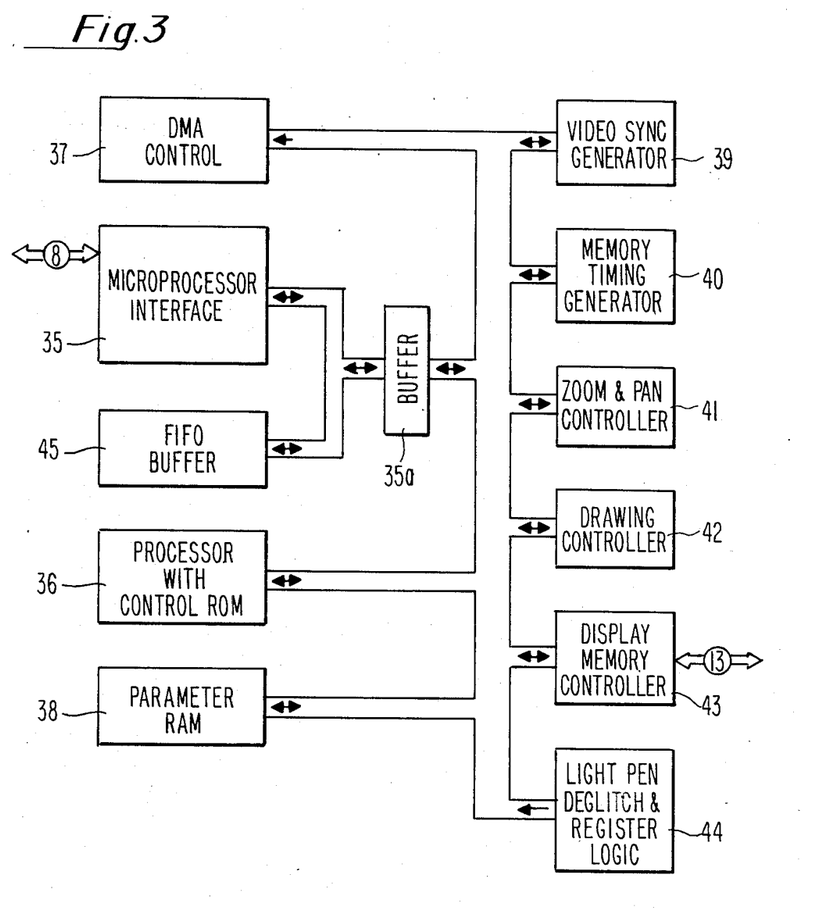
FIG. 3 is a schematic diagram of a commercially available graphic display controller as employed in the present invention.

The graphic display controllers 19 a, b and c of FIG. 2 are illustrated in more detail in FIG. 3. As was indicated above, such graphic display controllers are of a type that are commercially available and the present description is only for the purpose of understanding the relationship between these controllers and the present invention. As illustrated in FIG. 3 microprocessor interface 35 controls the communication between the host processor and the graphic display controller. The interface includes a status register (not shown) which is readable at any time and controls access to FIFO buffer 45 through flags in the status register. Access to FIFO buffer 45 is independent of other internal operations in the controller. Processor 36 and its associated control ROM interpret the contents of FIFO buffer 45, decodes command bytes and distributes succeeding parameters to destinations within the graphic display controller. Processor 36 yields to interface 35 when both are simultaneously attempting to access FIFO buffer 45.

Direct memory access (DMA) control 37 coordinates transfers over the microprocessor interface under control of DMA controller 27 of FIG. 2 for transferring display data from the host processor to the corresponding memory planes 18 a, b or c of FIG. 2. Parameter RAM 38 stores parameters that are used primarily during the display and drawing processes to be discussed more fully below.

Video sync generator 39 generates the raster timing signals for the display monitor and is programmed during an idle period following a reset as part of the initialization. Memory timing generator 40 provides a two-clock refresh cycle and also a read-modify-write cycle which takes four clock periods and also provides memory control signals to drive the display memory devices.

Zoom and pan controller 41 determines when to advance to the next memory address for display refresh and when to go on to the next display area depending upon display area entries in parameter RAM 38. The horizontal zoom is produced by slowing down the display refresh rate while maintaining the video sync rates. Vertical zoom is accomplished by accessing each line a number of times equal to the horizontal repeat.

Drawing controller 42 is a drawing processor which contains necessary logic to calculate the addresses and positions of pixels of various graphic figures. Given a starting point in appropriate drawing parameters, drawing controller 42 requires no further assistance to complete a figure drawing.

Display memory controller 43 is employed to multiplex the address and data information in and out of the corresponding memory plane 18 a, b or c of FIG. 2 and also contains logic to modify that display memory's contents during the read-modify-write cycles. Light Pen Deglitcher 44 handles light pen (not shown) inputs which occur at the same time during successive video fields.

Figure 4:
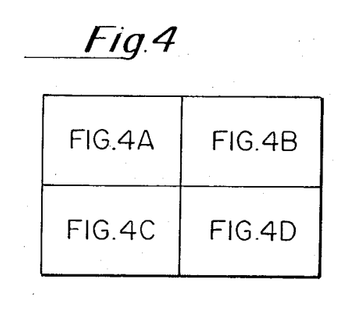
FIG. 4 is a block diagram illustrating the relation between FIGS. 4A-D.
Figure 4A:
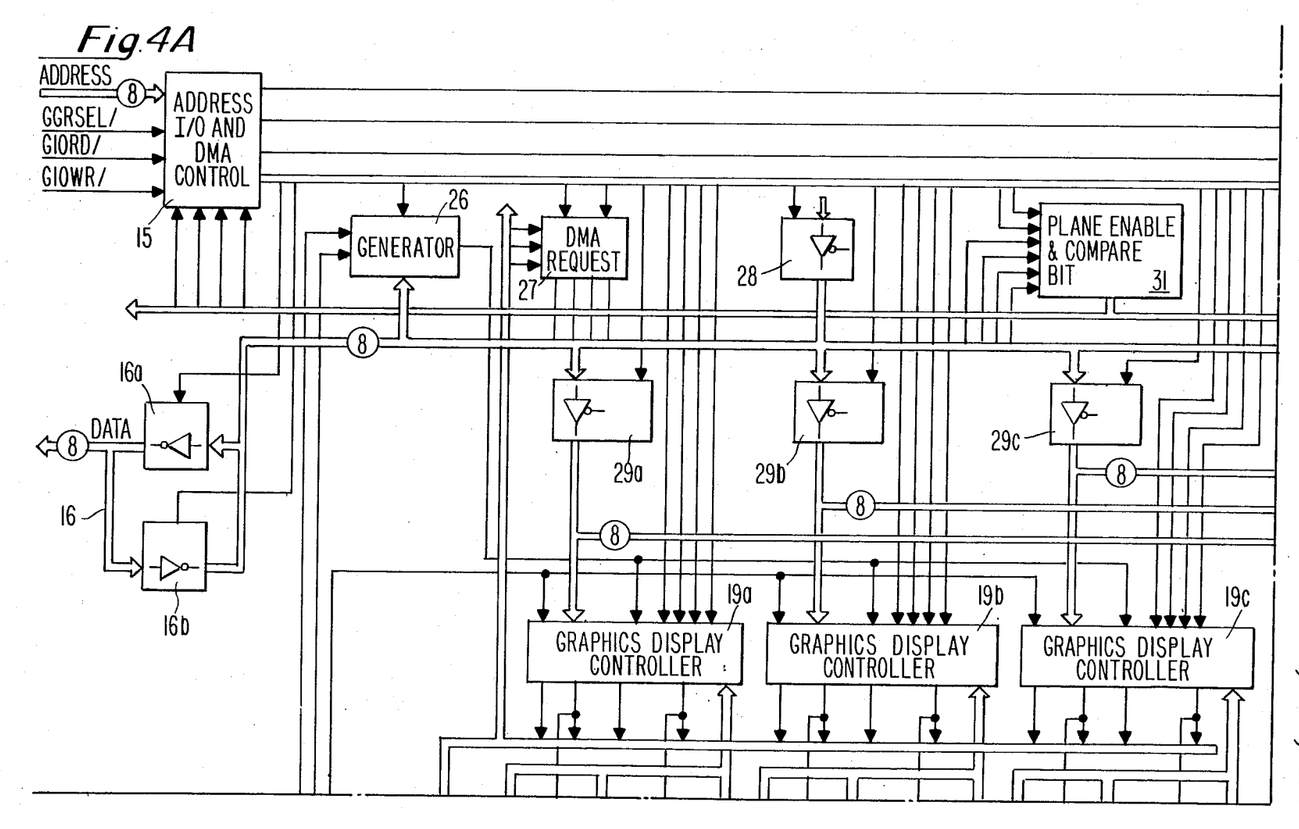
FIGS. 4A-D are schematic diagrams of various portions of the present invention.

Some of the elements of FIG. 2 that were not described above will now be described with reference to FIGS. 4A-D. For example, plane enable and compare bit register 31 of FIG. 2 and FIG. 4A is employed both to select which of any combination of memory planes and their corresponding graphics display controllers are to be selected to receive commands and data over the data bus interface including registers 16a and 16b and also to receive from the host processor the compare bits which are used with compare circuits 30 of FIG. 2 and FIG. 4B.

It will also be apparent from the employment of multiplexors 34a, b and c that the memory addresses supplied to the corresponding memory planes by respective graphic display controllers comprise both the row address and a column address so as to select the appropriate sets of pixel signals randomly or in any order.

Figure 4B:
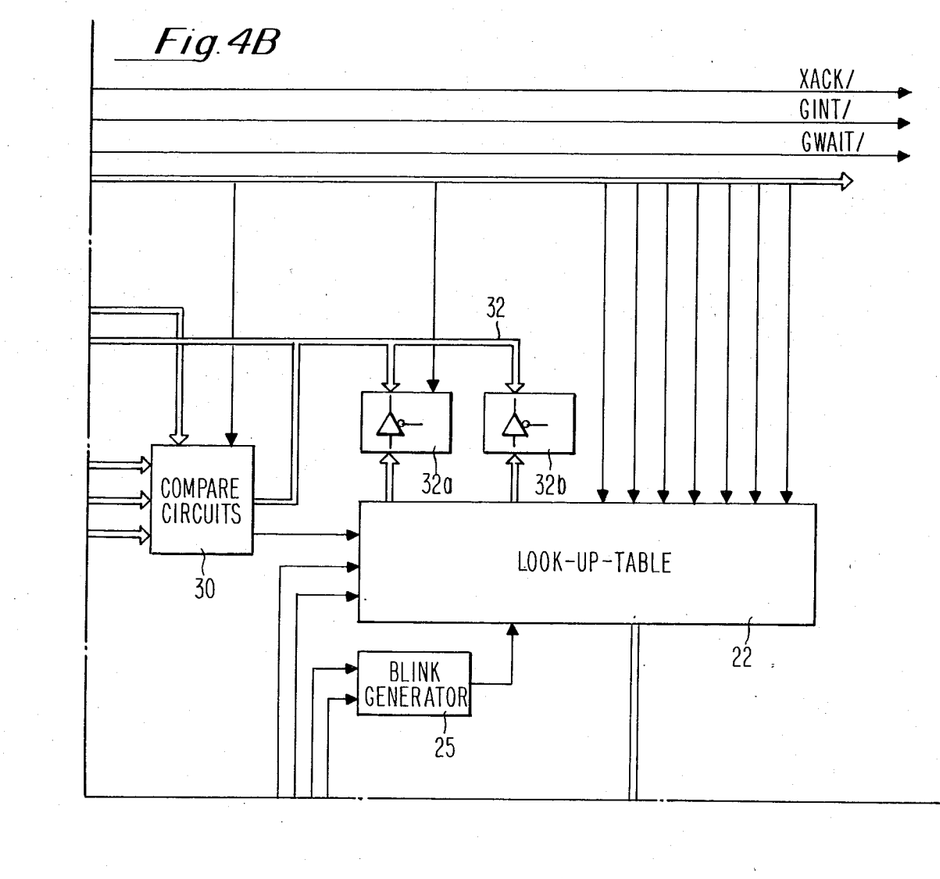
Figure 4C:
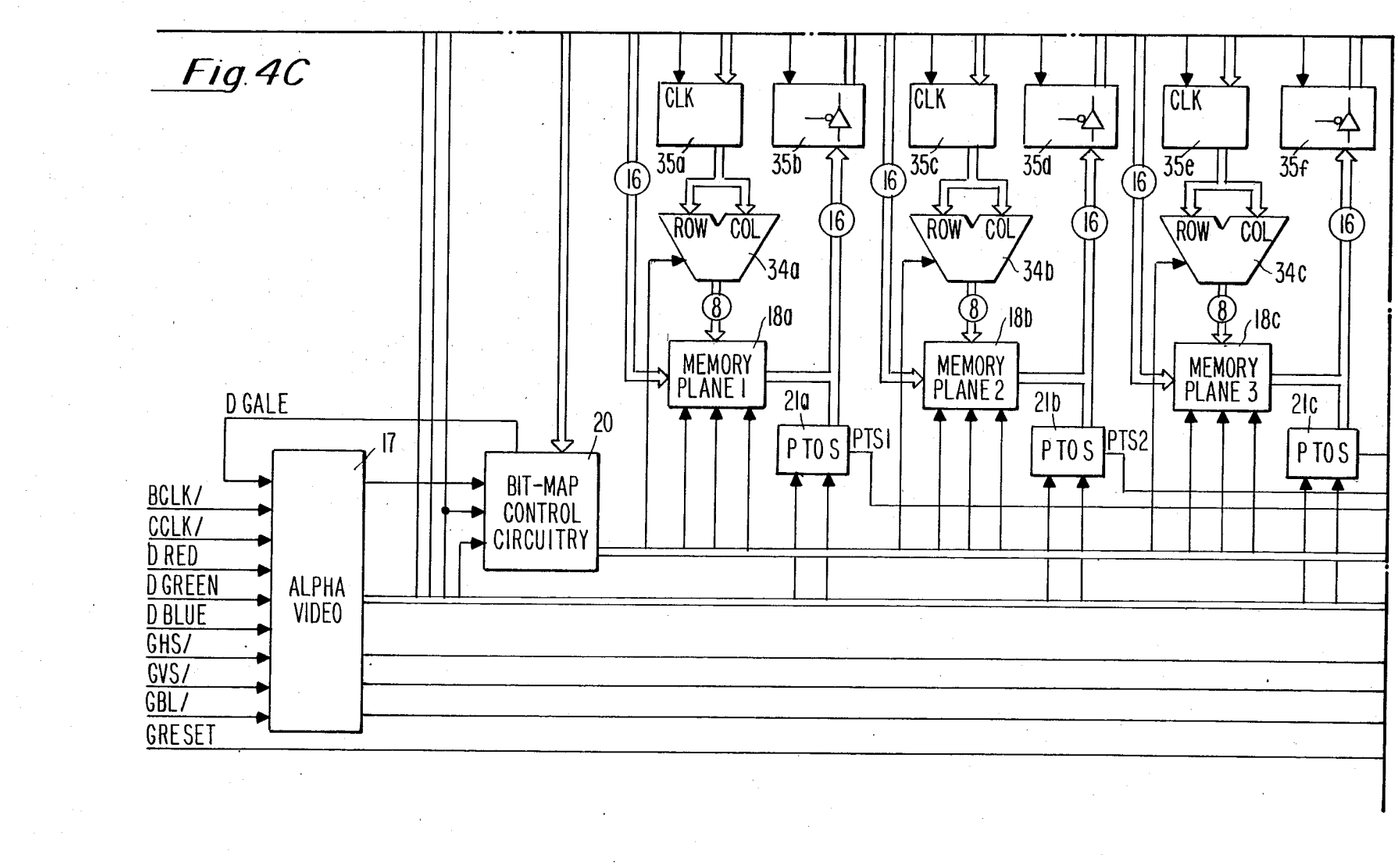
Figure 4D:
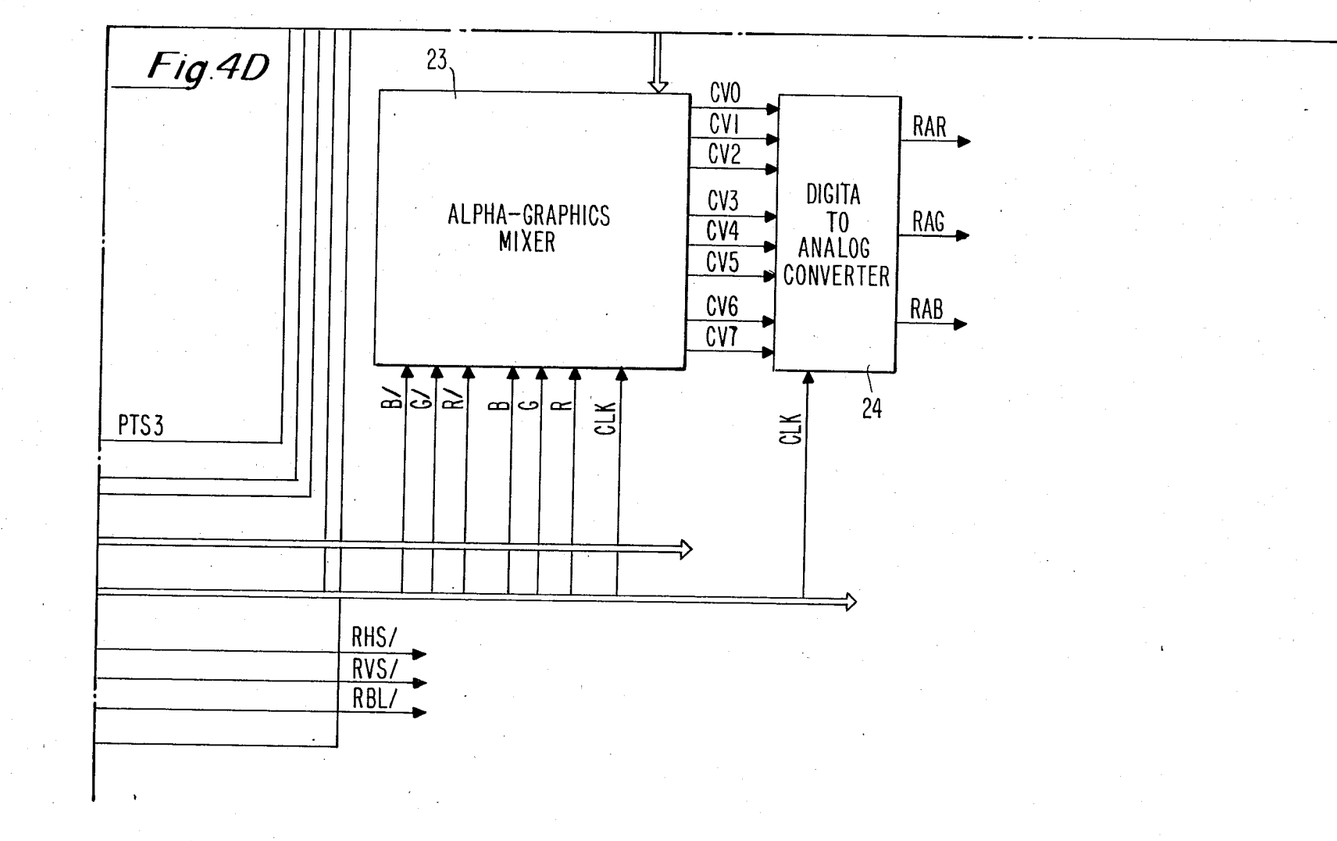
Figure 5A:
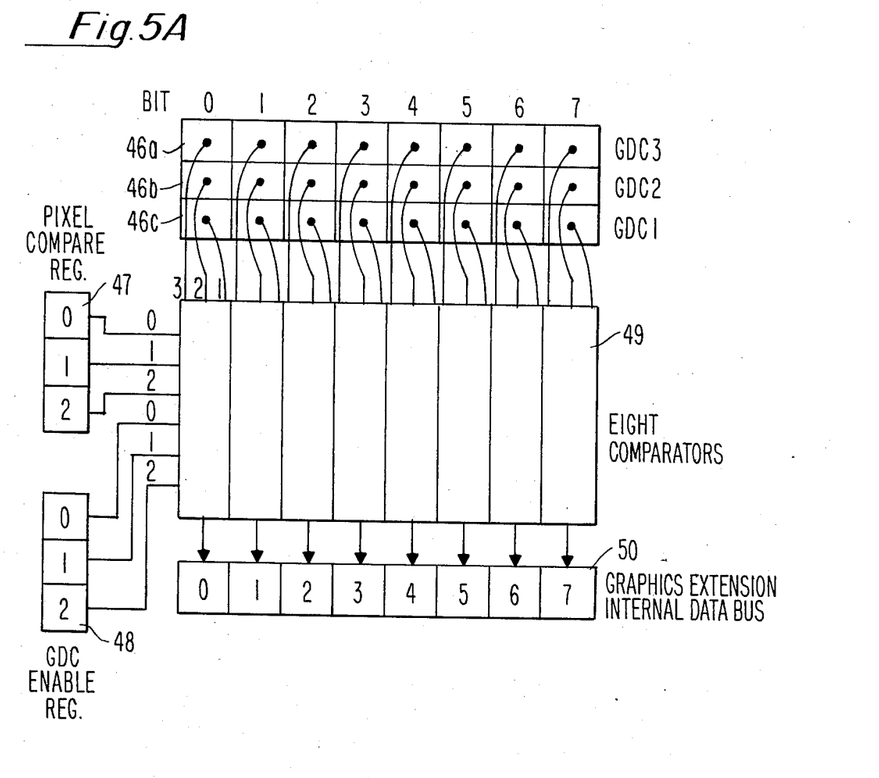
FIGS. 5A and B are schematic diagrams of compare circuitry employed in the present invention.

Referring now to FIG. 5A, the comparison circuits 30 of FIGS. 2 and 4B will now be described. As is indicated above, the outputs of the respective memory planes are transferred by way of the corresponding graphic display controllers through GDC output registers 46 a, b and c respectively for comparison by comparison circuits 49 with the contents of pixel compare register 47. The contents of the PIXEL COMPARE REGISTER 47 of 5B is loaded from the host processor. The contents of this register are used to compare the contents of the bit planes. The GDC ENABLE REGISTER 48 of FIG. 5B, which is also loaded from the host processor, determines which of the bit planes and the respective GDCs will partake the comparison.

Figure 5B:
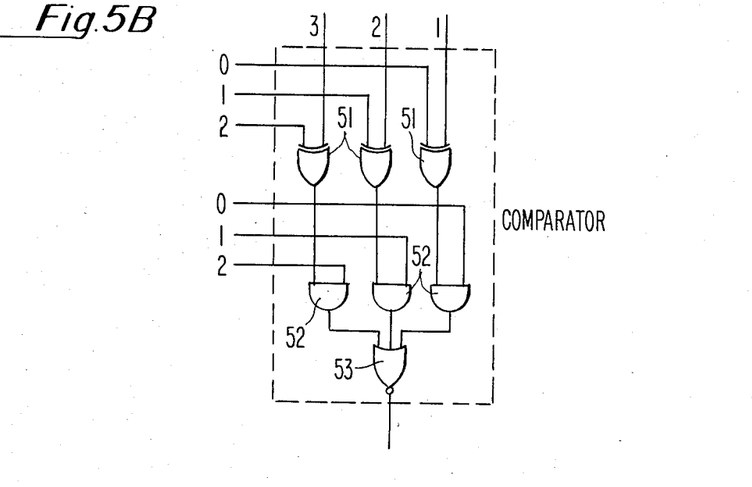

A schematic of the individual comparator circuits is illustrated in FIG. 5B and essentially includes three exclusive OR gates 51 which provide a true output only when the corresponding significant bit from pixel compare register 47 does not compare with the corresponding significant bit from the respective input compare registers 46 a, b or c. These outputs are then supplied to a corresponding AND gate 52 which is enabled by corresponding graphic display controller enable bit from graphic display controller enable register 48. The outputs of these AND gates are then fed into a NOR gate 53. The outputs of each NOR gate is supplied to the appropriate significant bit position of internal data bus register 50 for transmission back to the host computer by way of bus 32 of FIGS. 2 and 4B. In this manner, when the corresponding significant bits read out of respective enabled memory planes compare with the contents of pixel compare register 47, a signal for that particular significant bit of the memory plane read out is transferred back to the host processor thus enabling the host processor to determine whether or not a boundary line drawn by the respective graphic display controllers has been reached during a color fill operation.

Writing to multiple GDCs at the same time has been described above. However, it is not possible to read more than two GDCs at once with a sixteen bit microprocessor, as each has an 8 bit data bus (16 in FIG. 4A). This requires that the common data bus have one method of getting data to the GDC's registers 29a, b and c of FIGS. 2 and 4A and another to get data from the GDC's compare register 30 of FIGS. 2 and 4B. FIGS. 5A and 5B show the details of the Read logic.

There are three general reasons to read from the GDCs: (1) read the pixels from a specific plane of memory, (2) read the status of the Graphics Display Controller and (3) to find the boundary of a "FILL" figure.

In the first case, the hardware that is being developed is not useful in increasing performance. One GDC must be enabled at a time (FIG. 5A register 48). In FIG. 5B, the GDC Enable Register acts as a multiplexor selecting one of the GDCs. The Pixel Compare Register 47 is set to one so that the exclusive OR gate (register 51) inverts the data and then the NOR gate reinverts the data (register 53) to give unmodified data to the microprocessor.

In cases 2 and 3 significant improvement in performance can be realized by reading only once and getting information from all GDCs at once with one IORD instruction from the microprocessor.

The whole purpose behind that logic configuration is to especially increase the performance of "FILLING" by finding the boundaries of arbitrary figures. In a FILL algorithm, it is necessary to find where in the display memory the boundary of an arbitrary shape is. With the GDC this is done on a scan line basis. First a pixel is identified inside the shape. The scan line this pixel is on is scanned left and right of its location to find the boundary. When the left and right boundary is found, the scan line between these boundaries is replaced by the specified color and pattern. Then the scan lines above and below are searched in like manner until the whole boundary is found. This is a simplified description of the algorithm. The part that is of interest in this discussion is the searching of the boundary on the scan line.

All the GDCs are programmed to read the scan line to the right of the given pixel. The pixel compare register is loaded with the color of the boundary.

The microprocessor reads the first byte to the right of the given pixel. If all eight of the bits read by the microprocessor are zero, the boundary has not been found. If the boundary is not found the next eight pixels are read and so on, until a one, i.e. "compare" is read back. The first one read back indicates the boundary, the address of which can easily be calculated in the host processor. Using this special compare hardware makes the efforts to find a boundary in a system with more than one plane as easy as in a system with just one plane.

Without the hardware, a more complex software routine would be necessary. One GDC would be enabled, the data read, the value exclusive ORed with the bit value of the pixel in that plane. The other planes must be read. Then the bits of each pixel must be inspected to determine if they compare of the boundary pixel value. With the hardware improvement, this is all done in one read from the microprocessor and a significant overall system performance has been realized.

EPILOGUE

A system has been described for controlling the high resolution display down to the pixel level for a color display monitor which system employs a host processor to drive a plurality of graphic display controllers each accessing, in parallel, a separate bit map storage area or a plane. The respective planes are read out in parallel and converted for serial transmission with respective outputs being supplied in parallel as a code to a look-up table of color signals that are in turn supplied to a digital-to-analog converter that drives the display monitor. A plurality of such memory planes and corresponding graphic display controllers can be employed in parallel, the number of such memory planes determining the number of colors which can be selected for display by each pixel in the display monitor at a given time.

While but one embodiment of the present invention has been disclosed, it will be apparent to those skilled in the art that variations and modifications may be made therein without departing from the spirit and scope of the invention as claimed.

What is claimed is:
1. In a graphic control system for coupling a host digital processor to a raster scan display monitor, said system including a plurality of memories for storing data bit patterns representing an image to be displayed by said monitor, said image having a boundary, the method comprising:

simultaneously fetching a plurality of data bits, one from each of said memories where the bit from each respective memory represents a significant bit of a digital code employed to specify a luminance level of a picture element to be displayed by said display monitor;

comparing said digital code with a specified digital code received from said host processor, said specified code representing an image boundary luminance level;

repeating said fetching and comparing steps for a plurality of picture elements; and signalling said host processor when a comparison occurs thereby indicating that said code specifying an image boundary has been detected.

2. A method according to claim 1 wherein said display monitor displays said image line-by-scan line, each scan line being formed of a plurality of picture elements, the method further including:

signalling said host processor when a second code corresponding to a picture element in a given scan line compares with said specified digital code indicating that a code specifying a second boundary of said image has been detected.

3. A method according to claim 2 further including:

repeating said comparing and signalling steps for other scan lines until said image boundary has been determined.

4. A method according to claim 3 wherein said graphic control system includes a plurality of controllers, one for each of said plurality of memories, each controller including microcode means to load said respective memory with its data bit patterns representing an image to be displayed in response to commands from said host processor, the method further comprising:

loading said memories with bits representing a particular pattern representing said image.

5. A graphic control system for receiving digital commands and data from a host processor and providing analog signals of various voltage levels to a display monitor, said system having means for forming digital codes to specify said analog signal voltage levels, said system comprising:

a plurality of memories for receiving and storing bit patterns representing an image to be displayed, said image having a boundary;

a plurality of graphic control means each of which is coupled to said host processor and to a respective one of said plurality of memories for receiving parameters and commands for generating image bits for storage in the corresponding memories;

a plurality of output means each coupled to a corresponding memory for receiving a plurality of bits from its corresponding memory to form digital codes, each significant bit of which comes from a different one of said memories; and comparison means coupled to said plurality of memories for simultaneously receiving said pluralities of bits from said memories for comparison of each set of bits representing a digital code with a specified digital code received from said host processor, said comparison means being coupled to said host processor to signal it when a comparison occurs thereby indicating that an image boundary code has been detected.

6. A system according to claim 5 further including:

a data bus coupled between said host processor and the respective graphic control means to simultaneously provide commands to any combination of said graphic control means; and a controller enable means coupled to said host processor and to said graphic control means to specify which combination of controllers is to receive said commands.

7. A system according to claim 6 wherein:

each of said graphic control means includes microcode means to load said respective memory with bits representing said image to be displayed, said loading occurring in response to commands from said host processor.

* * * * *